United States Patent
Kim

(10) Patent No.: US 10,095,913 B2
(45) Date of Patent: Oct. 9, 2018

(54) USER AUTHENTICATION METHOD AND APPARATUS

(71) Applicant: Samsung Electronics Co., Ltd., Suwon-si (KR)

(72) Inventor: Jonghan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 15/152,006

(22) Filed: May 11, 2016

(65) Prior Publication Data
US 2017/0147862 A1    May 25, 2017

(30) Foreign Application Priority Data
Nov. 24, 2015 (KR) .................. 10-2015-0164581

(51) Int. Cl.
| | | |
|---|---|---|
| G06K 9/00 | (2006.01) | |
| G06F 17/30 | (2006.01) | |
| H04L 29/06 | (2006.01) | |
| G06Q 20/40 | (2012.01) | |
| G06F 21/36 | (2013.01) | |
| G06K 9/46 | (2006.01) | |

(52) U.S. Cl.
CPC ... *G06K 9/00087* (2013.01); *G06F 17/30256* (2013.01); *G06F 21/36* (2013.01); *G06K 9/00067* (2013.01); *G06K 9/00093* (2013.01); *G06K 9/4642* (2013.01); *G06Q 20/40145* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 6,181,805 B1* | 1/2001 | Koike | G06K 9/00288 382/118 |
| 6,289,114 B1 | 9/2001 | Mainguet | |
| 9,076,027 B2* | 7/2015 | Miura | G06K 9/00087 |
| 2005/0175225 A1* | 8/2005 | Shinzaki | G06K 9/0008 382/124 |
| 2006/0075255 A1* | 4/2006 | Duffy | G06K 9/00885 713/186 |
| 2010/0092048 A1 | 4/2010 | Pan et al. | |
| 2013/0300710 A1 | 11/2013 | Cho et al. | |
| 2014/0294261 A1* | 10/2014 | Abe | G06K 9/00006 382/124 |

(Continued)

FOREIGN PATENT DOCUMENTS

| | | | | |
|---|---|---|---|---|
| EP | 1833002 A1 * | 9/2007 | ......... | G06K 9/00228 |
| JP | 2003-51013 A | 2/2003 | | |

(Continued)

*Primary Examiner* — Delomia L Gilliard
(74) *Attorney, Agent, or Firm* — NSIP Law

(57) ABSTRACT

A user authentication method includes matching an input image, comprising biometric information of a user, to a grid, selecting a reference cell from a database that stores respective location and image information of a plurality of cells previously randomly extracted from a reference biometric image, identifying a target image in the input image corresponding to the reference cell using the grid, comparing the target image to image information of the reference cell, and authenticating the user based on a result of the comparing.

21 Claims, 16 Drawing Sheets

(56) References Cited

U.S. PATENT DOCUMENTS

2015/0116086 A1 4/2015 Kim et al.
2015/0186705 A1 7/2015 Magi
2015/0195789 A1 7/2015 Yoon et al.

FOREIGN PATENT DOCUMENTS

| JP | 2006-331355 A | | 12/2006 |
|---|---|---|---|
| JP | 4977830 B2 | | 7/2012 |
| JP | 5599605 B2 | | 10/2014 |
| KR | 100564762 B1 | * | 3/2006 |
| KR | 10-1112779 B1 | | 3/2012 |
| KR | 10-2015-0062085 A | | 6/2015 |

* cited by examiner

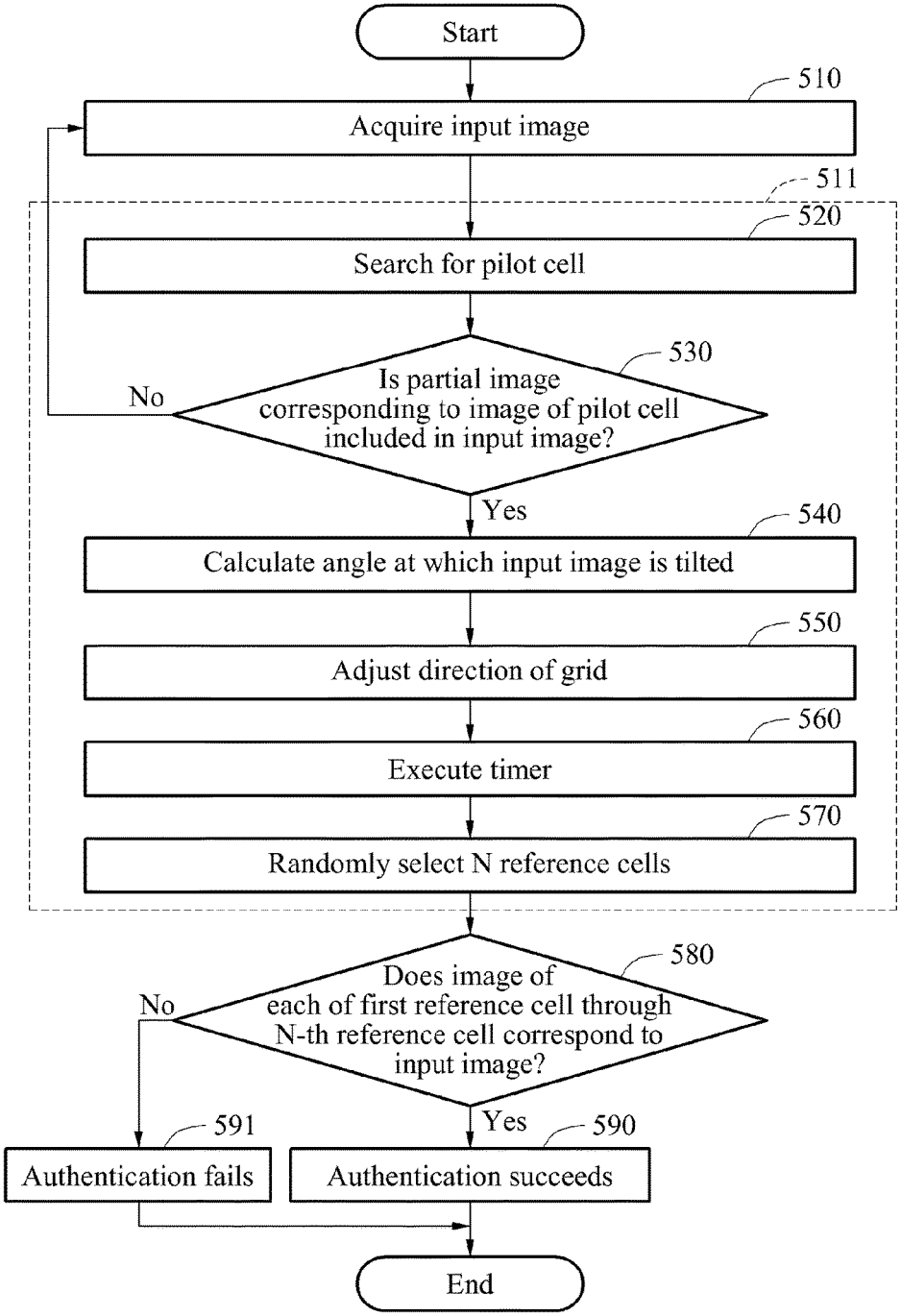

USER AUTHENTICATION METHOD AND APPARATUS

CROSS-REFERENCE TO RELATED APPLICATION(S)

This application claims the benefit under 35 USC 119(a) of Korean Patent Application No. 10-2015-0164581, filed on Nov. 24, 2015, in the Korean Intellectual Property Office, the entire disclosure of which is incorporated herein by reference for all purposes.

BACKGROUND

1. Field

The following description relates to a user authentication method and apparatus.

2. Description of Related Art

For user authentication, biometric information of a user is used to authenticate the user. For example, to authorize a payment service, a fingerprint of a user may be provided. However, when the biometric information is exposed or replicated due to hacking, it may become difficult or undesirable to use the hacked biometric information in an authentication method. For example, when a fingerprint of a user is exposed or replicated, the fingerprint may no longer be effective for user authentication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a user authentication method includes matching an input image, comprising biometric information of a user, to a grid, selecting a reference cell from a database that stores respective location and image information of a plurality of cells previously randomly extracted from a reference biometric image, identifying a target image in the input image corresponding to the reference cell using the grid, comparing the target image to image information of the reference cell, and authenticating the user based on a result of the comparing.

The identifying of the target image may include comparing a location information of the reference cell to the input image.

The selecting may include randomly selecting the reference cell from the database.

The matching may include determining an angle at which the input image is tilted with respect to a reference direction of the grid, and adjusting an orientation of the grid based on the angle. The determining may include searching for a pilot cell selected from the plurality of cells stored in the database, determining whether a partial image, corresponding to an image of the pilot cell, is included in the input image, and calculating the angle based on position information of the pilot cell from the database and position information of the partial image, based on the grid, in response to the partial image being determined to be included in the input image. The determining of whether the partial image is included in the input image may include, in response to a plurality of pilot cells from the database being found in the input image, determining whether partial images, respectively corresponding to images of the pilot cells, are included in the input image. The calculating of the angle may include, in response to the partial images being determined to be included in the input image and a distance between the partial images in the input image being determined to correspond to a distance between the pilot cells, calculating the angle.

The user authentication may further include determining whether distance information about a distance between a plurality of randomly selected reference cells from the database corresponds to distance information about a distance between target images in the input image. The comparing may include determining whether a target image, corresponding to position information of each of the reference cells, matches an image of each of the reference cells. In response to the target images being determined to be respectively matched to images of the reference cells and the distance information about the distance between the randomly selected reference cells being determined to correspond to the distance information about the distance between the target images, outputting feedback information indicating that the user is authenticated.

The user authentication method may further include, in response to a plurality of reference cells being randomly selected from the database, determining an order to compare each of the plurality of reference cells to target images of the input image. The comparing may include comparing a target image in the input image, corresponding to position information of each of the plurality of reference cells, to an image of each of the plurality of reference cells.

The plurality of cells may respectively correspond to a plurality of pieces of coordinate information randomly selected from a plurality of pieces of coordinate information of the grid corresponding to the reference biometric image.

The user authentication method may further include registering biometric information including acquiring a reference biometric image comprising biometric information of a user, matching the reference biometric image to a grid, extracting cells, from the reference biometric image, corresponding to coordinate information randomly selected from coordinate information of the grid, and storing the extracted cells in a database.

In another general aspect, a biometric information registration method includes acquiring a reference biometric image comprising biometric information of a user, matching the reference biometric image to a grid, extracting cells, from the reference biometric image, corresponding to coordinate information randomly selected from coordinate information of the grid, and storing the extracted cells in a database.

The biometric information registration method may further include storing only images of the extracted cells.

The biometric information registration method may further include selecting a pilot cell, from the extracted cells, capable of being used to determine an angle at which another acquired image is tilted with respect to a reference direction of the grid. The biometric information registration method may further include authenticating a user through matching an input image, comprising biometric information of a user, to a grid, selecting a reference cell from a database that stores respective location and image information of a plurality of cells previously randomly extracted from a reference biometric image, identifying a target image in the input image corresponding to the reference cell using the grid, comparing the target image to image information of the reference cell, and authenticating the user based on a result of the comparing. The angle may be calculated based on position information of the pilot cell and position information of a partial image corresponding to an image of the pilot cell in the reference biometric image. A reference cell may be randomly selected from the database in response to the other image being acquired. A target image corresponding to the reference cell in the input image may be identified using the grid and is compared to an image of the reference cell, and the user is authenticated based on a comparison result.

In another general aspect, an authentication apparatus includes a sensor configured to acquire an input image comprising biometric information of a user, and a processor configured to match the input image to a grid, select a reference cell from a database that stores respective location and image information of a plurality of cells previously randomly extracted from a reference biometric image, identify a target image in the input image corresponding to the reference cell using the grid, compare the target image to image information of the reference cell, and authenticate the user based on a result of the comparing.

A registration processor may be configured to adjust a size of the grid, a size of the plurality of cells, and a shape of the plurality of cells. The registration processor may be further configured to register the reference biometric image, comprising biometric information of a user, match the biometric reference image to the grid, randomly extract the plurality of cells, store the extracted plurality of cells in a database, and discard a plurality of remaining cells.

The reference cell may include a portion of the reference biometric image corresponding to coordinates of the extracted cell.

The reference cell may include a portion of the reference biometric image corresponding to coordinates of the extracted cell.

Other features and aspects will be apparent from the following detailed description, the drawings, and the claims.

BRIEF DESCRIPTION OF THE DRAWINGS

FIGS. 5A, 5B, 6, and 7 illustrate an example of a user authentication method.

Figure 1:
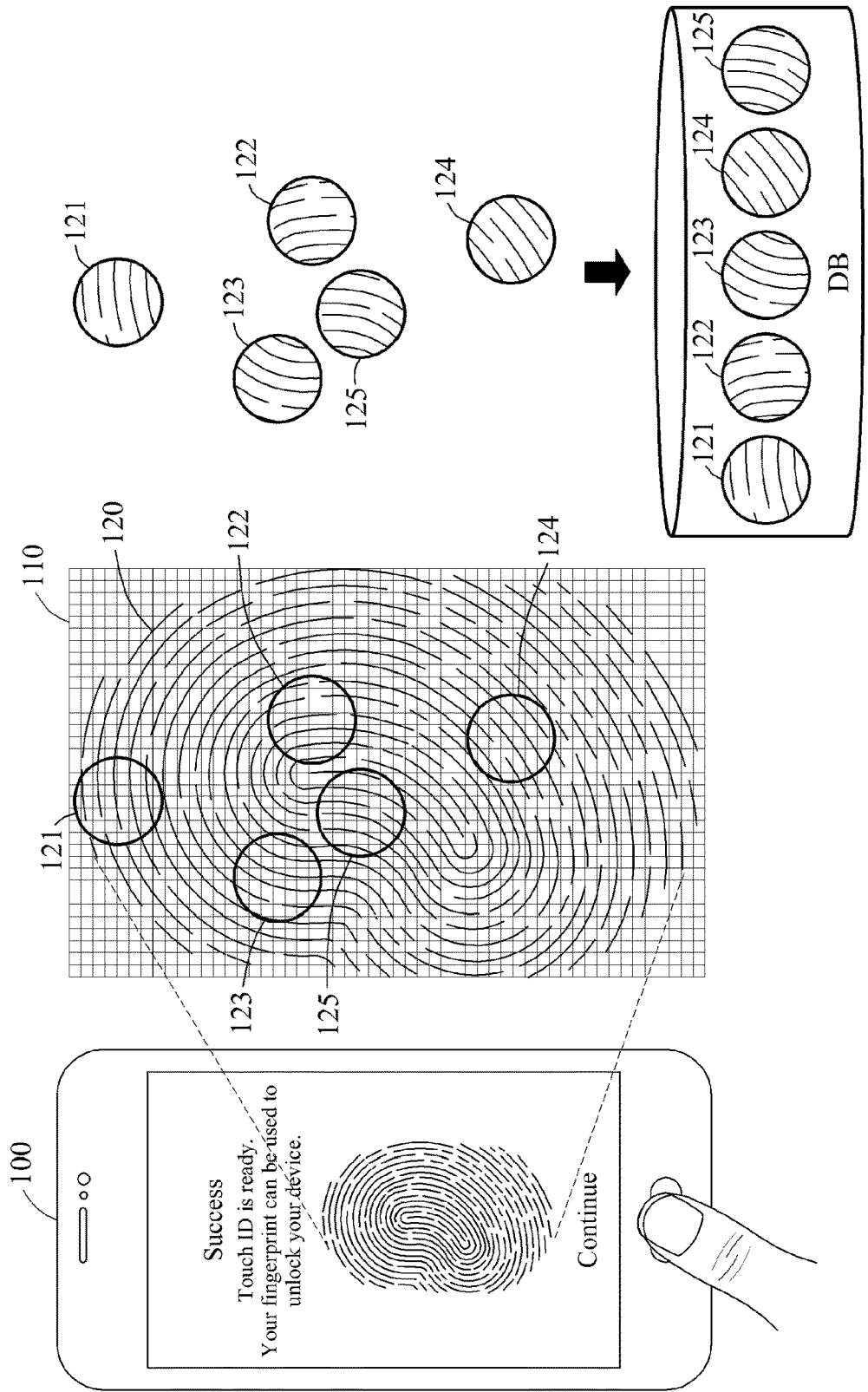
FIGS. 1, 2A, and 2B illustrate examples of a biometric information registration method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, differing examples will be described in detail with reference to the accompanying drawings.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Figure 2A:
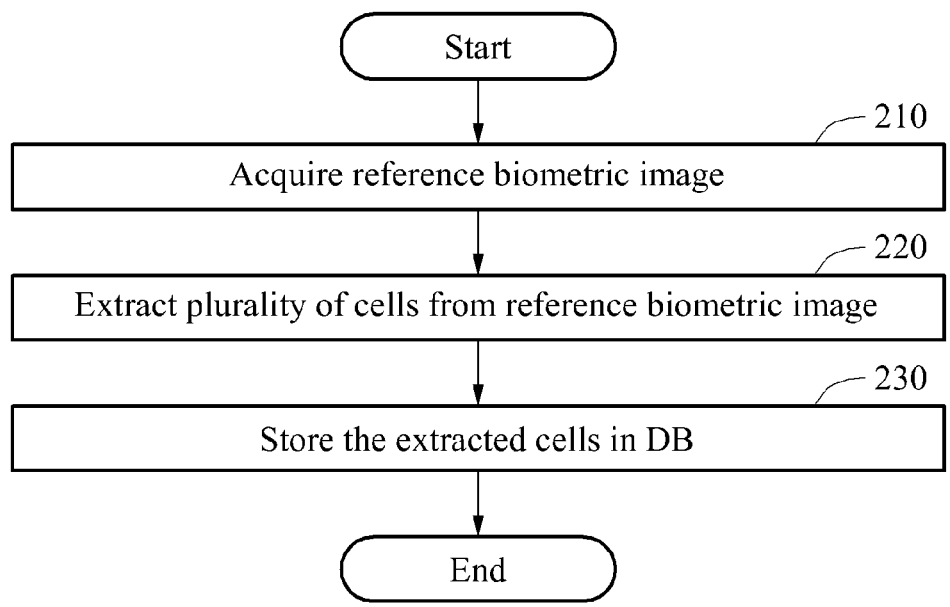
Figure 2B:
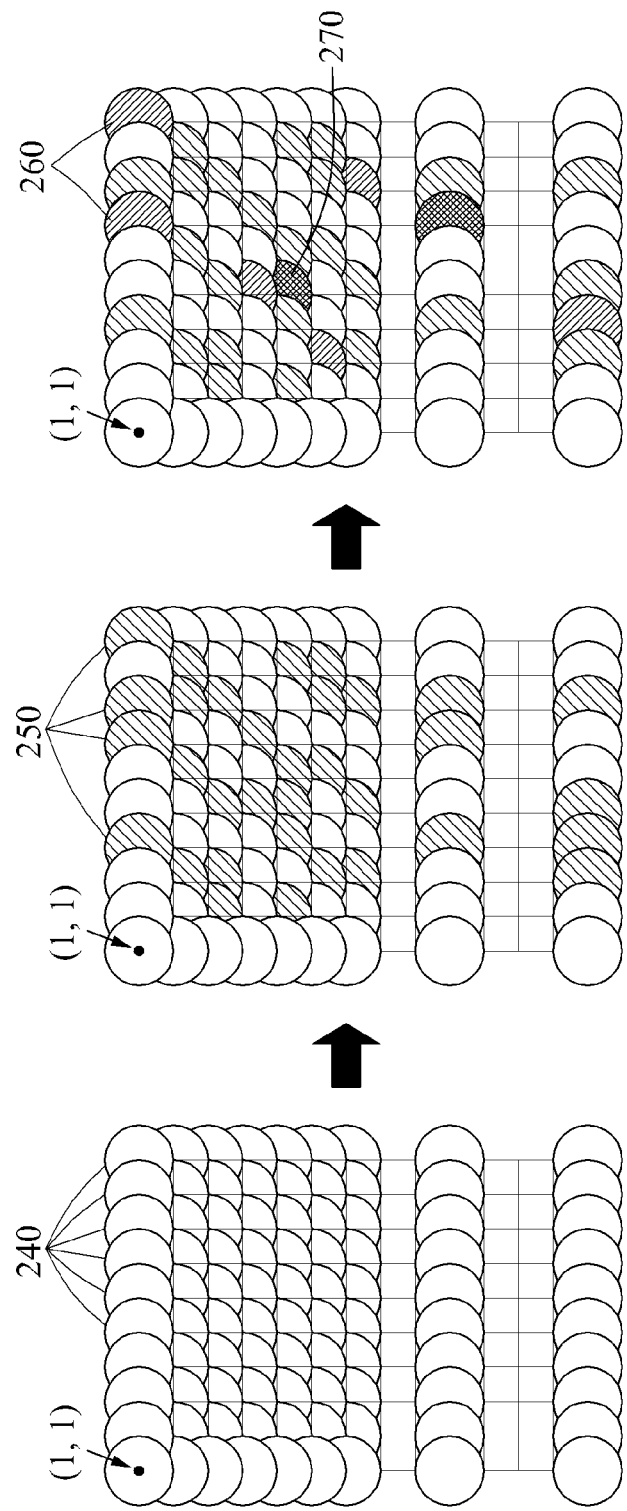

FIGS. 1, 2A, and 2B illustrate 1 example of a biometric information registration methods.

The biometric information registration method is performed by, for example, a registration apparatus. The registration apparatus includes, for example, a terminal 100 of FIG. 1 that includes one or more processing devices that control implementation of such a method; among other processes of the terminal 100. The registration apparatus receives an input of biometric information of a user. The biometric information includes, as only examples, one of a fingerprint, a palm print, a footprint, a skin, an image of a face and an image of an iris of the user, or any combination thereof.

When the biometric information is input, the registration apparatus acquires a reference biometric image 120 including the biometric information, such as through an initiating operation with the user and the input device of the terminal 100. When the reference biometric image 120 is acquired, the registration apparatus matches the reference biometric image 120 to a grid 110. The grid 110 may have a preset size. A size of a grid may be adjusted, which will be further described below. In an example, the reference biometric image 120 may be normalized with respect to the grid by adjusting either or both of the size and/or orientation of the reference biometric image 120 and the grid 110, or the orientation of the either of the reference biometric image 120 or the grid 110 may be adjusted to match an existing orientation of the reference biometric image 120 or grid 110. There may also be different available grids having different sizes, forms, or orientations from which to match with the reference biometric image 120.

The registration apparatus may select, identify, or determine a plurality of cells, for example, cells 121 through 125, in the reference biometric image 120. The registration apparatus may then respectfully extract information for cells 121 through 125 from the reference biometric image 120, and stores the respective information for cells 121 through 125 in a database (DB). For example, the registration apparatus may extract and store respectively determined coordinate information and image information for the cells 121 through 125 in the DB, such as for later respective obtaining of the cells 121 through 125 from DB, e.g., obtaining of the respective coordinate information and image information for the cells 121 through 125 from the DB, during an authentication operation. The coordinate information and image information for any particular cell stored in the DB may be collocated or stored in separate portions of the DB or another DB. As shown in FIG. 1, because the grid 110 and the reference biometric image 120 are matched to each other, the registration apparatus may determine the coordinate information of the cells 121 through 125 based on the grid, and stores the coordinate information in the DB. In an example, there may be a particular coordinate system predetermined for a particular grid, or such a coordinate system may be determined after selection or matching of the grid. Thus, returning to FIG. 1, when the cells 121 through 125 are extracted, the image information of the cells 121 through 125 is acquired, e.g., a partial biometric image corresponding to each of the cells 121 through 125 is acquired from the user's finger. The registration apparatus stores the respective partial image information for the cells 121 through 125 in the DB.

For example, the registration apparatus may store only select portions of a reference biometric image, instead of storing the whole acquired reference biometric image. Also, after extraction, the registration apparatus may delete the reference biometric image 120 and any other extracted image portions and any coordinate information of the reference biometric image 120 other than for the select DB stored portions, e.g., for cells 121 through 125, from the reference biometric image. A biometric information registration method such as that of FIG. 1, is further described with reference to FIGS. 2A and 2B.

Referring to FIG. 2A, in operation 210, the registration apparatus acquires a reference biometric image. The reference biometric image is, for example, a fingerprint image of FIG. 1, however, is not limited to the fingerprint image. The registration apparatus sets a parameter in advance and stores the parameter. The parameter includes, for example, one of a cell shape, a cell size, a size of a grid, a number of extracted cells, a number of pilot cells and a number of reference cells, or any combination thereof. The cell shape includes, for example, a circle or a square, or both.

In operation 220, the registration apparatus extracts a plurality of cells from the reference biometric image. For example, the registration apparatus extracts cells respectively corresponding to a plurality of pieces of coordinate information randomly generated or chosen from the grid. An example of extracting a plurality of cells is described with reference to FIG. 2B.

FIG. 2B illustrates an example of a grid. A grid has a preset size, for example, X×Y. X represents a number of vertical lines, or columns, and Y represents a number of horizontal lines, or rows. The grid of FIG. 2B has a size of 10×14. Accordingly, the grid may have coordinate information about coordinates (1, 1) through (10, 14). For example, when a reference biometric image is acquired, the registration apparatus matches the acquired reference biometric image to a grid with a size of X×Y.

Cells 240 are shown in the left illustration portion of FIG. 2B. The cells 240 respectively correspond to a plurality of pieces of coordinate information of the grid. For example, the cells 240 respectively correspond to the coordinates (1, 1) through (10, 14). In this example, there are 140 total number of cells 240, which is also the same number as the pieces of coordinate information. The number of the cells 240 is determined based on a preset size of a cell. When a size of a cell 240 is the same as a grid interval as shown in FIG. 2B, the number of cells 240 is the same as the number of the pieces of coordinate information. When the size of the cell 240 is different from the grid interval, the number of cells 240 is different from the number of the pieces of coordinate information. For example, when the size of the cell 240 is greater than the gap interval, the number of the cells 240 is less than the number of the pieces of coordinate information.

The registration apparatus randomly extracts a plurality of cells from the reference biometric image. For example only, the registration apparatus randomly selects at least one piece of the coordinate information from the grid, such as randomly selecting first axis values and/or second axis values from the grid. The randomly selected first axis values may be limited by the size of the grid. Similarly, the randomly selected second axis values may be limited by the size of grid. For example only, when the grid has a size of 10×14 as shown in FIG. 2B, the registration apparatus randomly selects a first axis value from 1 through 10. Also, the registration apparatus randomly selects a second axis value from 1 through 14. The registration apparatus combines the selected first axis value and the selected second axis value. Accordingly, a plurality of pieces of coordinate information are randomly selected from the grid.

When a number of extracted cells is set in advance, the registration apparatus randomly selects a preset number of the pieces of coordinate information from the grid. As shown in FIG. 2B, 50 pieces of coordinate information, for example, coordinate information about coordinates (1, 4), (1, 7), (1, 8), (1, 10), (2, 3) or (14, 8), are randomly selected.

Thus, the registration apparatus extracts cells from the biometric image corresponding to the randomly selected pieces of coordinate information. For example, in FIG. 2B, the registration apparatus extracts cells 250 from the biometric image respectively corresponding to the randomly selected coordinates, for example, the coordinates (1, 4), (1, 7), (1, 8), (1, 10), (2, 3) or (14, 8). The middle illustration of FIG. 2B illustrates the extracted cells 250. The extracted cells 250 are shown distinguishably from the cells 240, i.e., extracted cells 250 are shown with hashing in the middle illustration compared to the non-hashed cells 240.

In operation 230, the registration apparatus stores the extracted cells in the DB. The registration apparatus stores the position information and the respective image information of each of the extracted cells 250 in the DB. The position information includes, for example, the coordinate information of the grid for the corresponding cell 250. Thus, in the example of FIG. 2B, the registration apparatus stores the coordinate information about each of the coordinates (1, 4), (1, 7), (1, 8), (1, 10), (2, 3) or (14, 8) respectively corresponding to the respective extracted cells 250 in the DB. Also, the registration apparatus stores image information of each of the extracted cells 250 in the DB. As described above with reference to FIG. 1, each of the image information stored in the DB corresponds to a partial biometric image matched to the randomly selected coordinate information, i.e. the randomly selected coordinate system of the grid.

The registration apparatus deletes images other than images of the extracted cells from the reference biometric image. In other words, in an embodiment, the registration apparatus only stores partial biometric images, less than all of the reference biometric image, randomly extracted from the reference biometric image in the DB, instead of storing the entire reference biometric image.

In the right illustration of FIG. 2B further illustrating select pilot cells 270, the registration apparatus may select the pilot cells 270 from the extracted cells 250. A pilot cell 270 may be used to determine an angle at which an input image acquired for user authentication is tilted in a reference direction of the grid. The reference direction is, for example, a vertical direction or a horizontal direction determined based on a pilot cell. The registration apparatus may randomly select the pilot cells 270 from the extracted cells 250, for example. In the right illustration of FIG. 2B, cells respectively corresponding to coordinates (5, 5) and (10, 7) are shown as having been selected as pilot cells 270. The pilot cells 270 are shown distinguishably from the cells 240 and the extracted cells 250.

Also, the right illustration of FIG. 2B illustrates reference cells 260 that have been selected from the extracted cells 250, which will be described further below. The reference cells 260 are used for a comparison to a later input image, where a preset number of reference cells 260 may be randomly selected. For example, when a number of reference cells 260 is set to 6 in advance, six reference cells 260 are randomly selected from the extracted cells 250. In the right illustration of FIG. 2B, the reference cells 260 are shown distinguishably from the other cells.

A user changes a parameter. For example, in an embodiment, the user interface of the terminal 100 may request the user select the parameter from the paragraphs available. The user changes the parameter and registers biometric information in the registration apparatus. The registration apparatus may include a processor configured to register reference cells, grid size, cell size and cell shape information in the database. For example, the user changes at least one of a size of a grid, a cell shape and a cell size. In FIG. 2B, the grid has the size of 10×14, and each cell has a circular shape and a size of 1, however, the grid size, cell shape, and cell size are not limited thereto and may be varied. Accordingly, the user may change the size of the grid, the shape or the size of each cell, or any combination thereof. For example, through the user interface of the terminal 100, the user sets or changes the size of the grid to 20×20, sets or changes a cell shape to a "square," and sets or changes a cell size to 2. Due to a change in the parameters, image information of the corresponding extracted cells will be different. For example, when the parameter can be changed, it becomes difficult to extract a cell with the same image as images of the cells 121 through 125 of FIG. 1. Thus, when the biometric information registration method is performed based on the changed parameter, a cell previously stored in the DB will be different from a cell newly stored in the DB.

Thus, when the DB in which the extracted cells are stored is hacked, a user may waive (or delete) the DB, changes the parameter, and through a new registration process the terminal 100 may store the new biometric information in a new DB. As described above, cells already stored in the DB, that is, the waived DB are different from cells stored in the new DB. Thus, despite a security breach, for example, hacking, a user may register new biometric information, for example, a fingerprint, and may continue to use the newly registered biometric information for user authentication.

Figure 3:
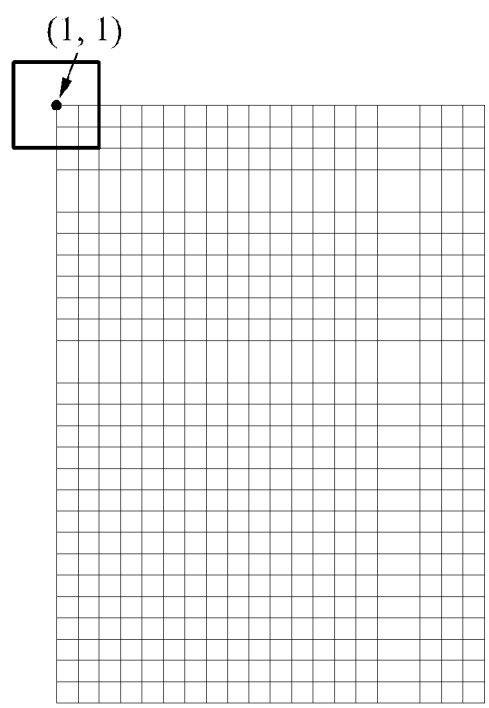
FIG. 3 illustrates an example of a grid.

FIG. 3 illustrates an example of a grid. Referring to FIG. 3, the grid includes vertical lines, or columns, and horizontal lines, or rows. The grid of FIG. 3 includes 21 vertical lines and 29 horizontal lines. In other words, the grid has a size of 21×29. The size of the grid is set in advance before biometric information is registered.

In FIG. 3, a cell corresponding to coordinates (1, 1) is shown. The cell has a shape of a square and a size of 2. The shape and size of the cell are set in advance before biometric information is registered. A user changes at least one of a size of a grid, a cell shape, and a cell size, such as through the user interface of a registration apparatus. For example, every time the user registers biometric information in the registration apparatus, the user change, or be required or requested to change, at least one of a size of a grid, a cell shape, and a cell size.

The grid and the cell of FIG. 3 are merely examples, and the description of the grid and cell is not limited to the above example and may be varied.

Figure 4:
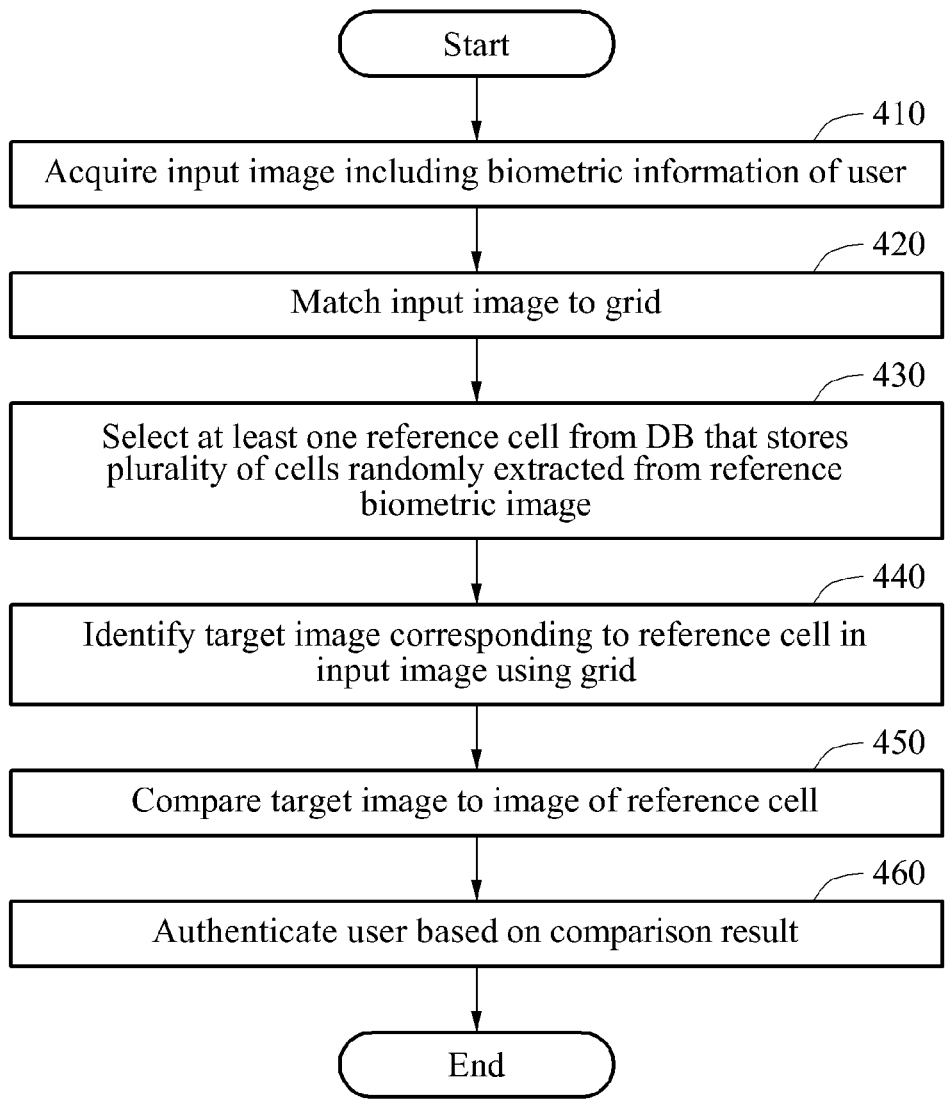
FIG. 4 illustrates an example of a user authentication method.

FIG. 4 illustrates an example user authentication method. Referring to FIG. 4, the user authentication method is performed by, for example, an authentication apparatus. As only an example, in an embodiment, the terminal 100 of FIG. 1 may implement the user authentication method.

In operation 410, the authentication apparatus acquires an input image including biometric information of a user. In an example, the authentication apparatus acquires a fingerprint image of a user using a fingerprint recognition sensor, e.g., included in the authentication apparatus or in communication therewith. In another example, the authentication apparatus acquires an iris image of a user using an iris recognition sensor, e.g., similarly included in the authentication apparatus or in communication therewith, and acquires a face image of the user using a face recognition sensor (for example, a camera).

In operation 420, the authentication apparatus matches the input image to a grid. An example of a process of matching a grid to an input image will be further described with reference to FIGS. 5A and 5B below.

In operation 430, the authentication apparatus selects at least one reference cell from a DB that stores a plurality of cells randomly extracted from a reference biometric image. The grid corresponds to the reference biometric image and includes a plurality of pieces of coordinate information. For example, when a size of the grid is 10×14, the grid includes coordinate information on coordinates (1, 1) through (10, 14). A plurality of pieces of coordinate information are randomly selected from the plurality of pieces of coordinate information included in the grid. For example only, 50 pieces of coordinate information based on coordinates (1, 4), (1, 7), (1, 8), (1, 10), (2, 3) or (14, 8), are randomly selected from 140 pieces of coordinate information. In this example, cells respectively corresponding to the selected pieces of coordinate information are identified or determined in the input image. Because a cell shape and a cell size are set in advance, e.g., based on the chosen shape or size used when registering the DB stored information, the cells are identified or determined in the input image based on the set cell shape and the set cell size. When the cells are determined, a corresponding plurality of cells are extracted from the input image.

Thus, when the input image is acquired, the authentication apparatus selects reference cells from the DB. The authentication apparatus randomly selects reference cells from the cells already stored in the DB. For example, the authentication apparatus randomly selects at least one piece of coordinate information from 50 pieces of coordinate information in the DB, such as, coordinate information about coordinates (1, 4), (1, 7), (1, 8), (1, 10), (2, 3) or (14, 8), stored in the DB, and determines each cell corresponding to each randomly selected piece of coordinate information as a reference cell.

In operation 440, the authentication apparatus identifies respective target images, corresponding to the reference cells, in the input image using the grid. As described above, as the grid is matched to the input image, the authentication apparatus identifies a target image with the same coordinate information as coordinate information of the reference cell. The target image is, for example, a partial image of the input image and that corresponds to the coordinate information of the reference cell. For example, when a cell having coordinates (1, 4) is selected as a reference cell, the authentication apparatus identifies a target image of the input image located at (1, 4) in the input image based on the grid applied to the input image.

In operation 450, the authentication apparatus compares the target image to image information of the reference cell. The DB stores image information of the reference cell. The authentication apparatus retrieves the image information of the reference cell, and compares the target image to the image of the reference cell. For example, the authentication apparatus determines whether the target image is substantially the same as the image of the reference cell.

In operation 460, the authentication apparatus authenticates the user based on a result of the comparison of operation 450. When the target image is substantially the same as the image of the reference cell, the authentication apparatus outputs feedback information indicating a success in authentication. For example, the authentication apparatus outputs an authentication success message as feedback using one of a visual scheme, an auditory scheme and a tactile scheme or any combination thereof. Alternatively, or in addition, the authentication apparatus may make additional services of the user interface of the terminal available in operation 460.

Though not limited thereto, the description of FIGS. 1 through 3 is also applicable to the user authentication method of FIG. 4, and accordingly is not repeated here.

FIGS. 5A, 5B, 6, and 7 illustrate an example of a user authentication method.

Figure 5A:
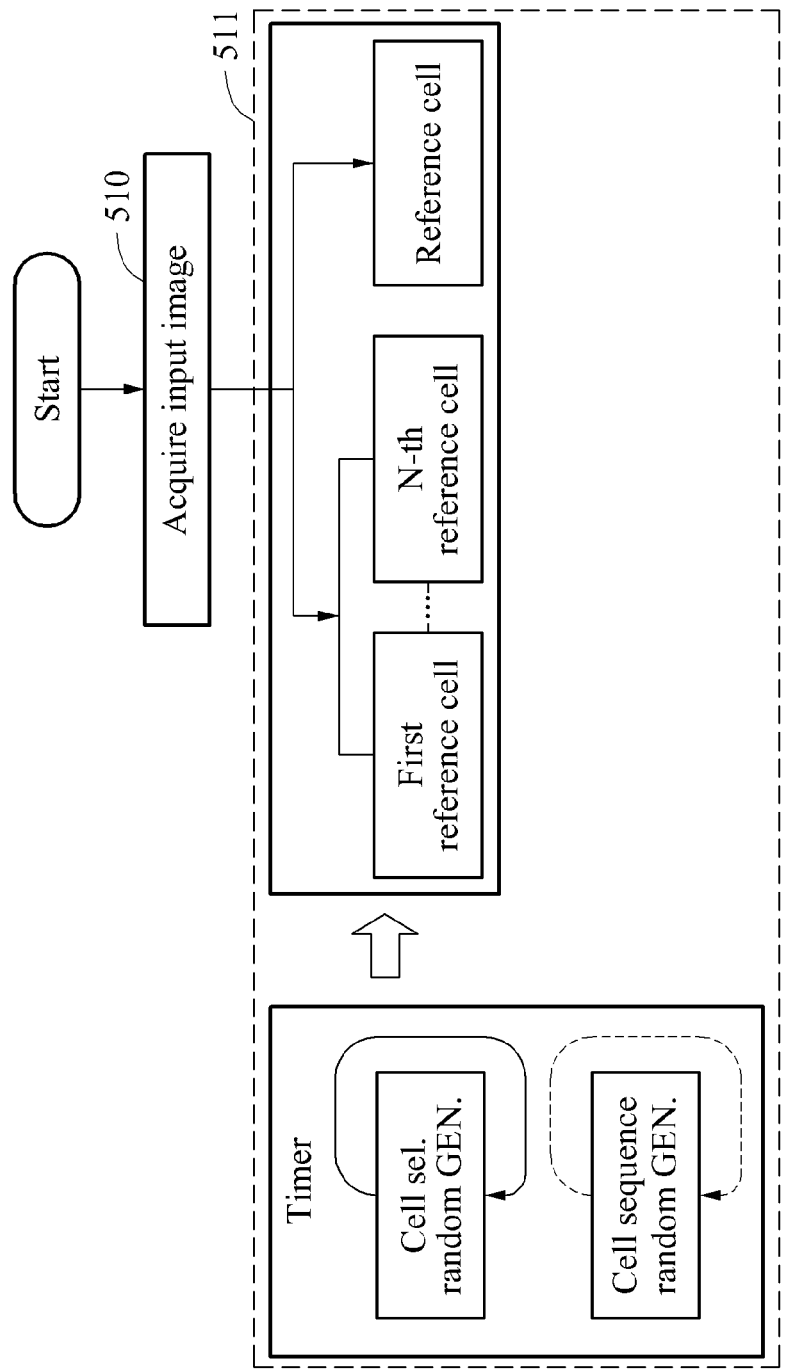

Referring to FIG. 5A, in operation 510, an authentication apparatus acquires an input image. The input image has been described above with reference to FIG. 4, and accordingly further description thereof is not repeated here.

In operation 511, the authentication apparatus selects a first reference cell through an N-th reference cell from the DB and determines distance information about distance(s) between the first reference cell through the N-th reference cell and distance(s) between corresponding partial images found in the input image. For example, when the input image is acquired, the authentication apparatus randomly selects the N reference cells from the DB, searches for corresponding partial images in the input image, and bases authentication on a comparison of the reference cells and any found partial images in the input image. Here, the authentication apparatus determines an order of the selected N reference cells. The user authentication method is further described with reference to FIG. 5B.

Referring to FIG. 5B, when an input image is acquired in operation 510, the authentication apparatus searches the input image for a pilot cell in operation 520. The pilot cell has been described above, and accordingly further description thereof is not repeated here.

In operation 530, the authentication apparatus determines whether a partial image corresponding to an image of the pilot cell is included in the input image. When the partial image is determined to be included in the input image, the authentication apparatus calculates an angle at which the input image is tilted in a reference direction of a grid based on position information of the pilot cell and position information of the partial image in operation 540. The reference direction is, for example, a vertical direction or a horizontal direction determined based on coordinate information of the pilot cell.

For example, when the acquired input image is tilted with respect to the reference direction of a grid, the grid and the input image are not matched to each other. Because the input image is not matched to the grid, it is difficult to compare the input image to information of the reference biometric image stored in the DB, as the reference biometric image was matched to the grid during the corresponding registration operation. Here, the authentication apparatus searches for a pilot cell stored in the DB to match a corresponding partial image of the input image, for matching the input image to the grid. The authentication apparatus determines whether there is a partial image in the input image that matches, or is the same, as an image of the pilot cell stored in the DB. When such a partial image is found or determined to be included in the input image, the authentication apparatus verifies coordinate information of the found partial image based on the grid. The coordinate information of the found partial image may be, for example, coordinates (8, 8). Coordinate information of the pilot cell is stored in the DB. Accordingly, the authentication apparatus calculates an angle at which the input image is tilted with respect to the reference direction based on the coordinate information of the found partial image and the coordinate information of the pilot cell from the DB. For example, when the coordinate information of the pilot cell is (5, 5), the authentication apparatus calculates an arc tangent value between the coordinates (5, 5) and the coordinates (8, 8) of the found partial image. The arc tangent value is calculated as 45°. Thus, the authentication apparatus determines that the input image is tilted at 45° with respect to the reference direction.

In operation 550, the authentication apparatus adjusts a direction or orientation of the grid based on the determined angle. For example, when the determined angle is 45°, the authentication apparatus rotates the grid 45° to match the grid to the input image.

In an embodiment, a plurality of pilot cells may be searched for in the input image and corresponding respective partial images found as a result of search. In this example, the authentication apparatus determines whether the partial images, respectively corresponding to images or image information of the pilot cells from the DB, are included in the input image. When the partial images are determined to be included in the input image, the authentication apparatus determines position information (for example, coordinate information) of each of the found partial images. When the position information is determined, the authentication apparatus determines whether a distance between the found partial images corresponds to a distance between the corresponding pilot cells. When the distances are determined to correspond to each other, the authentication apparatus calculates an angle at which the input image is tilted with respect to the reference direction of the grid based on the position information of the found partial images and position information of the pilot cells. The authentication apparatus rotates the grid based on the calculated angle, to match the grid to the input image.

When the grid and the input image are matched, the authentication apparatus randomly selects N reference cells from the DB. N denotes a number of reference cells and is set in advance. For example, in operation 560, the authentication apparatus executes a timer. In operation 570, the authentication apparatus randomly selects N reference cells from the DB in response to the timer being executed. When a user is not authenticated during a preset authentication time (for example, during a period of time in which the timer is executed), the authentication apparatus randomly reselects N reference cells from the DB. Different reference cells are selected based on a time of generation or selection. For example, a period of time during which a timer is executed is assumed as 1 minute. In this example, when whether authentication succeeds or fails for 1 minute is not determined, the authentication apparatus re-executes the timer and randomly reselects N reference cells from the DB. The randomly reselected N reference cells are different from the randomly selected N reference cells, which may strengthen security for user authentication.

When the N reference cells are selected, the authentication apparatus determines whether an image of each of the first reference cell through the N-th reference cell can be found in the input image in operation 580. The authentication apparatus identifies a target image in the input image with the same coordinate information as coordinate information of each of the first reference cell through the N-th reference cell. The authentication apparatus identifies a first target image in the input image with the same coordinate information as coordinate information of the first reference cell, and identifies an N-th target image in the input image with the same coordinate information as coordinate information of the N-th reference cell. The authentication apparatus determines whether each of the first target image through the N-th target image are the same as the corresponding images of each of the first reference cell through the N-th reference cell from the DB.

In an example, the authentication apparatus simultaneously performs a comparison between an image of the first reference cell and the correspondingly located first target image in the input image through a comparison between an image of the N-th reference cell and the correspondingly located N-th target image in the input image. In this example, the authentication apparatus compares an image of a second reference cell to a correspondingly located second target image in the input image, regardless of a result of the comparison between the image of the first reference cell and the correspondingly located first target image.

In another example, the authentication apparatus determines an order of the N reference cells. The order is the order that the respective comparisons are performed between an image of a select reference cell from the DB and a corresponding target image in the input image. For example, the authentication apparatus assigns numbers 1, 2, and N to the first reference cell, the second reference cell, and the N-th reference cell, respectively. The authentication apparatus determines whether the image of the first reference cell with the assigned number 1 is the same as the correspondingly located first target image of the input image. When the image of the first reference cell is determined to be the same as the correspondingly located first target image, the authentication apparatus determines whether the image of the second reference cell with the assigned number 2 is the same as the correspondingly located second target image in the input image. In this example, the authentication apparatus compares the image of the second reference cell to the second target image based on a result of the comparison between the image of the first reference cell and the first target image.

The authentication apparatus determines whether distance(s) between target images in/from the input image corresponds to distance(s) between the first reference cell through the N-th reference cell. In this example, when each of the target images in the input image is the same as a corresponding image of each of the first reference cell through the N-th reference cell and when the distances between the target images correspond to the distances between the reference cells, the authentication apparatus determines that the user is authenticated, e.g., the user is authorized to access or utilize additional services of the underlying terminal or that a corresponding electronic transaction is approved.

The authentication apparatus authenticates the user during execution of the timer. For example, when the timer is being executed, e.g., before expiration of the timer, the authentication apparatus determines whether an image of each of the first reference cell through the N-th reference cell corresponds to the input image. Also, when the timer is being executed, the authentication apparatus determines whether distance(s) between target images correspond to distance(s) between the first reference cell through the N-th reference cell.

Thus, in operation 590 or 591, the authentication apparatus determines whether authentication succeeds or fails. For example, a determination of whether the authentication has succeeded or failed may not be made until the timer expires or has expired. In this example, if authentication fails, the authentication apparatus may re-execute the timer and randomly reselect N reference cells for comparison with the input image or a new input image.

When the user is authenticated, the authentication apparatus may provide the user with feedback information indicating a success in the authentication. For example, as described above, the authentication apparatus provides an authentication success message using one of a visual scheme, an auditory scheme and a tactile scheme or any combination thereof. In addition, or alternatively, when the user is authenticated the user may gain further access to the terminal or to access of additional services of the terminal, and/or an underlying electronic transaction may merely approved and implemented, such as for an electronic cash payment or exchange.

Figure 6:
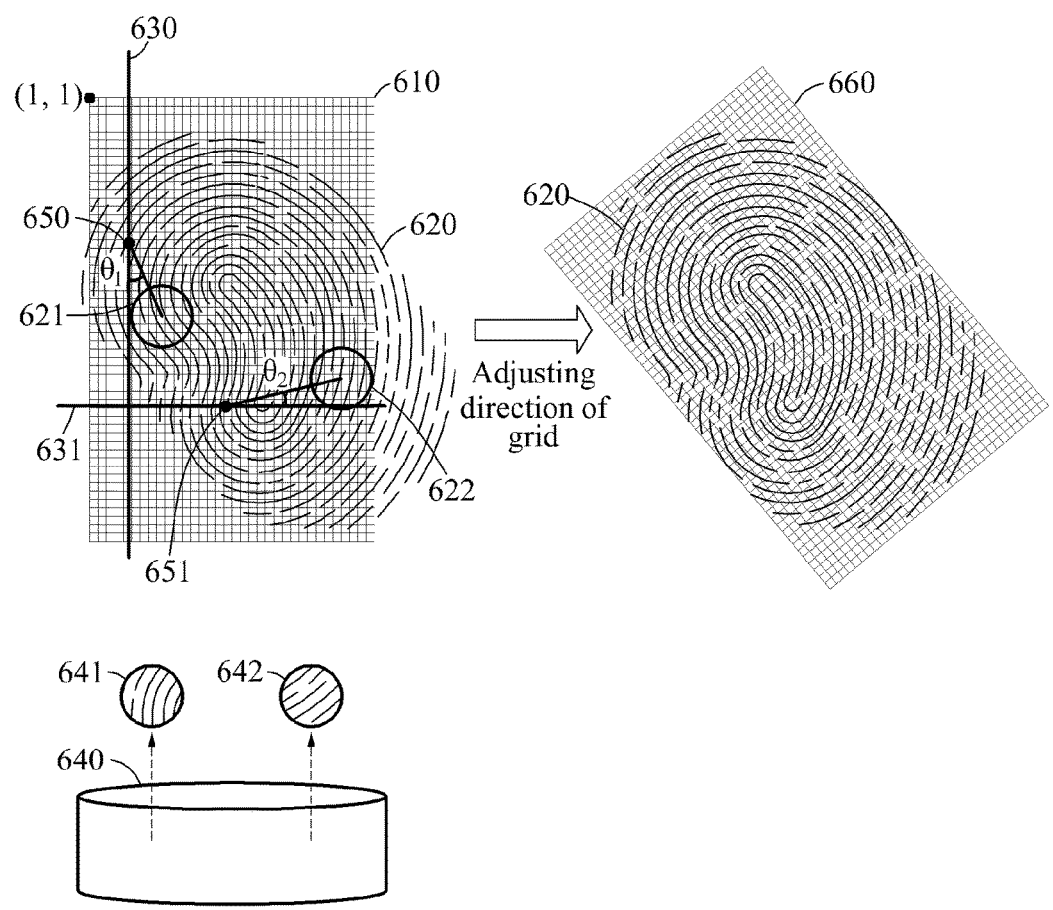

FIG. 6 illustrates a grid 610 and an input image 620. The input image 620 is not matched to the grid 610. An authentication apparatus calculates an angle at which the input image 620 is tilted in reference directions 630 and 631. The reference directions 630 and 631 correspond to coordinate information of a pilot cell 641 and coordinate information of a pilot cell 642, respectively. The pilot cells 641 and 642 are stored in a DB 640. The reference direction 630 is a vertical direction determined based on the coordinate information of the pilot cell 641, and the reference direction 631 is a horizontal direction determined based on the coordinate information of the pilot cell 642.

The pilot cells 641 and 642 are extracted from a reference biometric image and are stored in the DB 640, before the input image 620 is acquired.

In FIG. 6, the coordinate information of the pilot cell 641 and the coordinate information of the pilot cell 642 are assumed to be coordinates $(x_1, y_1)$ 650 and $(x_2, y_2)$ 651. The authentication apparatus determines whether the same partial image as an image of each of the pilot cells 641 and 642 is included in the input image 620. For example, the authentication apparatus determines coordinate information for each of the partial images 621 and 622 based on the grid 610. For example, the authentication apparatus determines the coordinate information of the partial image 621 and the coordinate information of the partial image 622 as $(\alpha_1, \beta_1)$ and $(\alpha_2, \beta_2)$, respectively.

The authentication apparatus determines first distance information regarding a distance between the partial images 621 and 622 and second distance information regarding a distance between the pilot cells 641 and 642. When the first distance information is determined to be the same or is substantially the same as the second distance information, the authentication apparatus calculates an angle $\theta_1$ at which the input image 620 is tilted with respect to the reference direction 630 based on the coordinate information of the partial image 621 and the coordinates $(x_1, y_1)$ 650 of the pilot cell 641. The angle $\theta_1$ is calculated as $\arctan((\alpha_1-x_1)/(\beta_1-y_1))$. Also, the authentication apparatus calculates an angle $\theta_2$ at which the input image 620 is tilted with respect to the reference direction 631 based on the coordinate information of the partial image 622 and the coordinates $(x_2, y_2)$ 651 of the pilot cell 642. The angle $\theta_2$ is calculated as $\arctan((\alpha_2-x_2)/(y_2-\beta_2))$. When the angles $\theta_1$ and $\theta_2$ are calculated, the authentication apparatus determines an average value of the angles $\theta_1$ and $\theta_2$ as an angle to rotate the grid so as to match the grid to the input image. Also, even though both the pilot cells 641 and 642 may have been found in the input image, the authentication apparatus calculates one of angle $\theta_1$ and $\theta_2$, instead of calculating both the angles $\theta_1$ and $\theta_2$.

The authentication apparatus adjusts a direction of the grid 610 based on the angle $\theta_1$ and/or $\theta_2$. Thus, a grid 660 of which the direction is adjusted thereby becomes matched to the input image 620.

Figure 7:
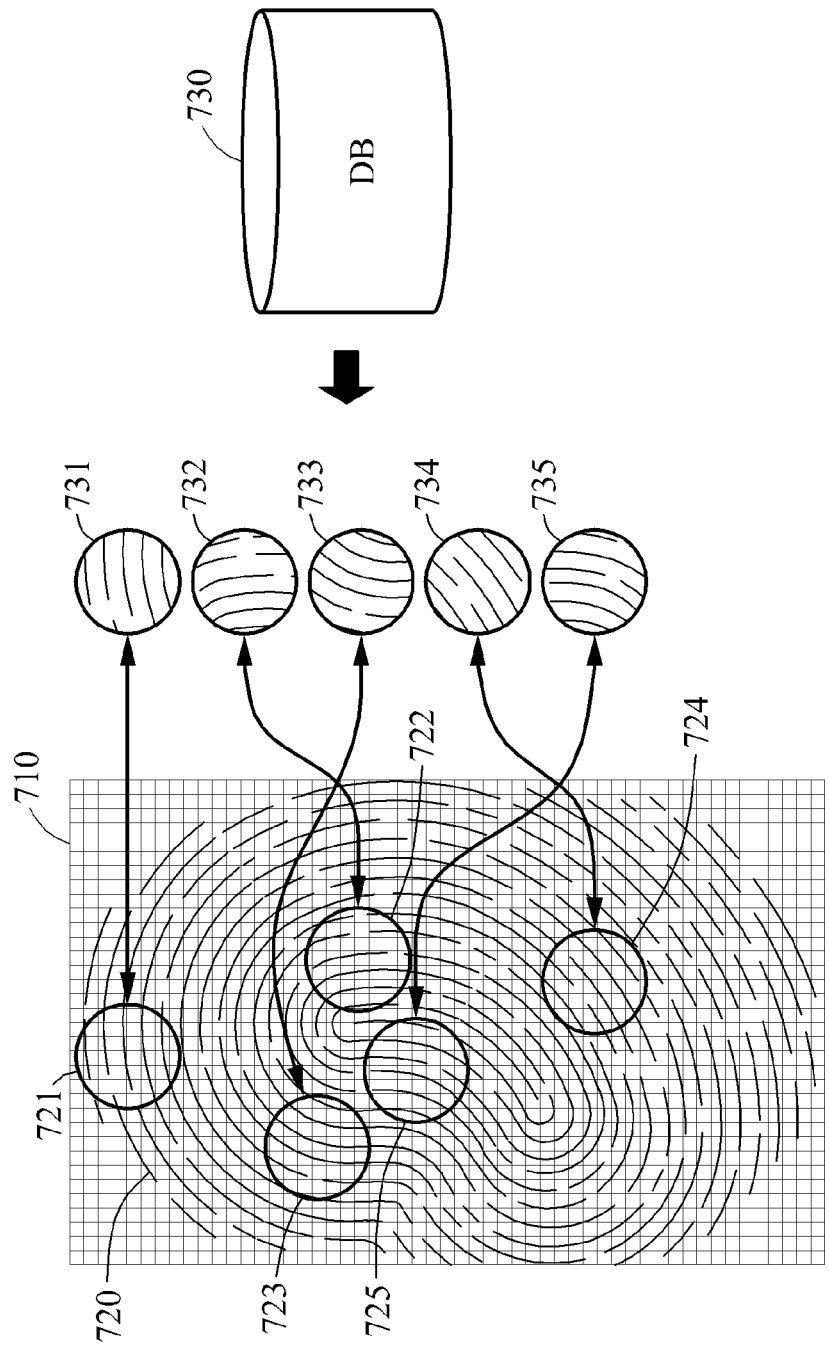

Referring to FIG. 7, a grid 710 and an input image 720 are matched to each other. An authentication apparatus selects a plurality of reference cells, for example, reference cells 731, 732, 733, 734 and 735, from a DB 730. The DB 730 stores image information and coordinate information of each of the reference cells 731 through 735. The authentication apparatus acquires the image information and coordinate information of each of the reference cells 731 through 735 from the DB 730. The coordinate information of the reference cells 731 through 735 corresponds to, for example, coordinates $(x_3, y_3)$ through $(x_7, y_7)$, respectively.

The authentication apparatus identifies target images located in the coordinates $(x_3, y_3)$ through $(x_7, y_7)$ in the input image based on the grid 710. The authentication apparatus identifies a plurality of target images, for example, target images 721, 722, 723, 724 and 725.

The authentication apparatus compares each of the target images 721 through 725 to an image of each of the reference cells 731 through 735. In FIG. 7, the authentication apparatus compares the target image 721 to an image of the reference cell 731 that has the same coordinate information as coordinate information of the target image 721. Similarly, the authentication apparatus compares the other target images to images of the other reference cells that have respectively the same coordinate information as coordinate information of the other target images. Also, the authentication apparatus compares distance information about a distance between the target images 721 through 725 to distance information about a distance between the reference cells 731 through 735.

The authentication apparatus authenticates a user based on a comparison between images and a comparison between distance information.

Figure 8:
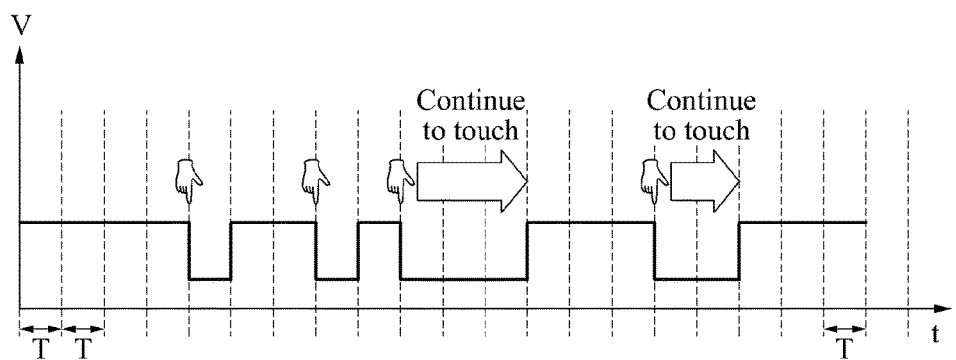
FIG. 8 illustrates an example of a user authentication method.
Figure 9A:
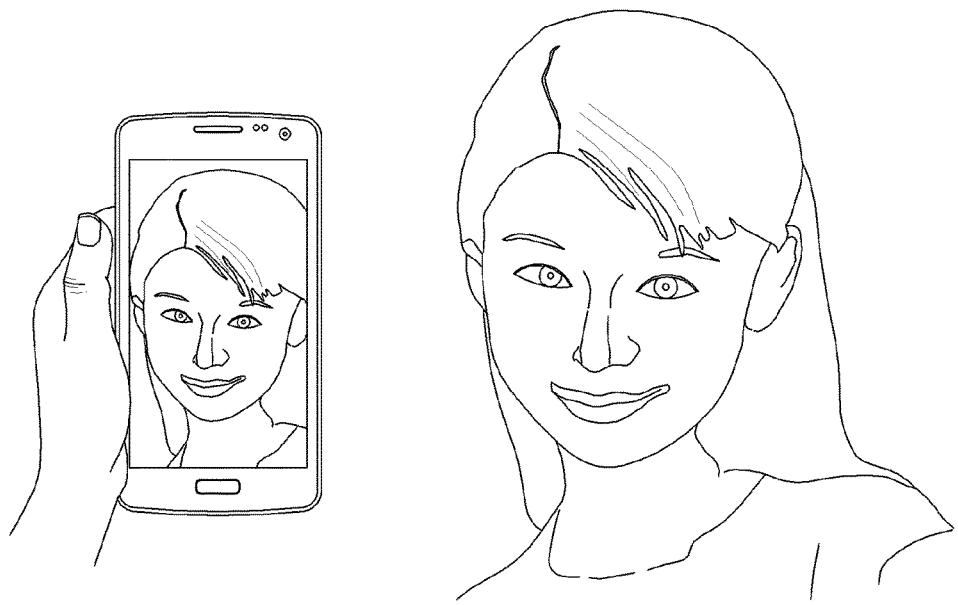
FIGS. 9A, 9B, 9C, and 9D illustrate examples of a biometric image including biometric information.
Figure 9B:
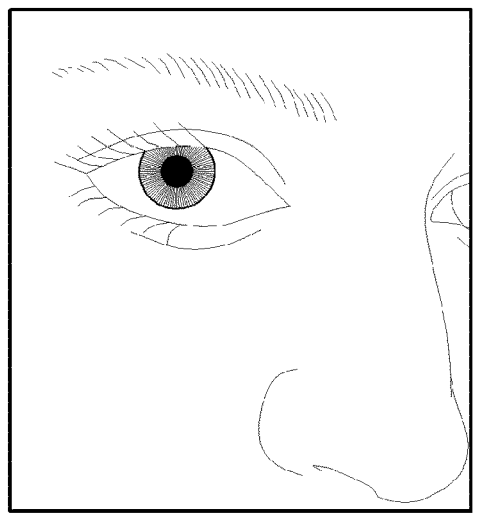
Figure 9C:
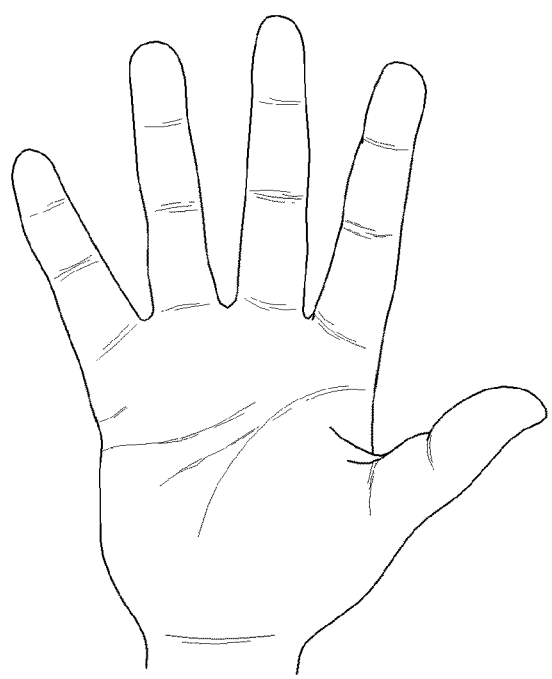
Figure 9D:
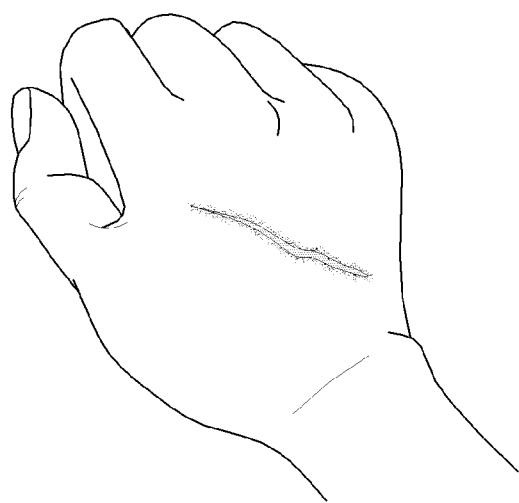

FIG. 8 illustrates still another example of the user authentication method. Referring to FIG. 8, an authentication apparatus receives an input of a user's gesture.

The authentication apparatus stores a predetermined authentication pattern and compares an input pattern of the user's gesture to the predetermined authentication pattern, to authenticate the user.

For example, when a capacitive touch interface is touched by a body part of a user, a constant voltage of the capacitive touch interface changes as shown in FIG. 8. A pattern of a change in the constant voltage corresponds to the input pattern of the user's gesture. The authentication apparatus compares the pattern of the change in the constant voltage to the predetermined authentication pattern and authenticates the user.

The authentication apparatus authenticates a user by combining the user authentication methods of FIGS. 4 through 8, for example. In an example, the authentication apparatus performs a primary authentication process using the user authentication method of FIG. 8, and performs a secondary authentication process using the user authentication methods of FIGS. 4 through 7. In another example, the authentication apparatus performs a primary authentication process using the user authentication methods of FIGS. 4 through 7, and performs a secondary authentication process using the user authentication method of FIG. 8. A combination of the user authentication methods is merely an example, and is not limited to the above description.

FIGS. 9A, 9B, 9C and 9D illustrate examples of biometric images. The biometric image is, for example, a reference biometric image used for registration of biometric information. Also, the biometric image is, for example, an input image used for user authentication.

Referring to FIGS. 9A through 9D, the biometric image may be, for example, a face image, an iris image, a palm print image and a skin image. For example, when a user has a scar, the scar is unique information used to authenticate the user. A registration apparatus acquires an image of a skin with the scar and registers biometric information based on the acquired image. An authentication apparatus also acquires the image of the skin with the scar and authenticates the user based on the acquired image.

A terminal includes the above-described registration apparatus and the above-described authentication apparatus. The terminal registers biometric information, compares the registered biometric information to an input image, and performs user authentication. For example, the terminal acquires a reference biometric image for registration of biometric information. The terminal extracts a plurality of cells from the reference biometric image and stores the extracted cells in a DB. Also, the terminal acquires an input image for user authentication. The terminal randomly selects reference cells from the DB, and compares the reference cells to corresponding target images of the input image. The terminal authenticates a user based on a result of this comparison.

The biometric images of FIGS. 9A through 9D are merely examples, and a biometric image capable of being acquired by the registration apparatus and/or the authentication apparatus is not limited to those described above.

FIGS. 10A, 10B, 11 and 12 illustrate examples of user authentication.

Figure 10A:
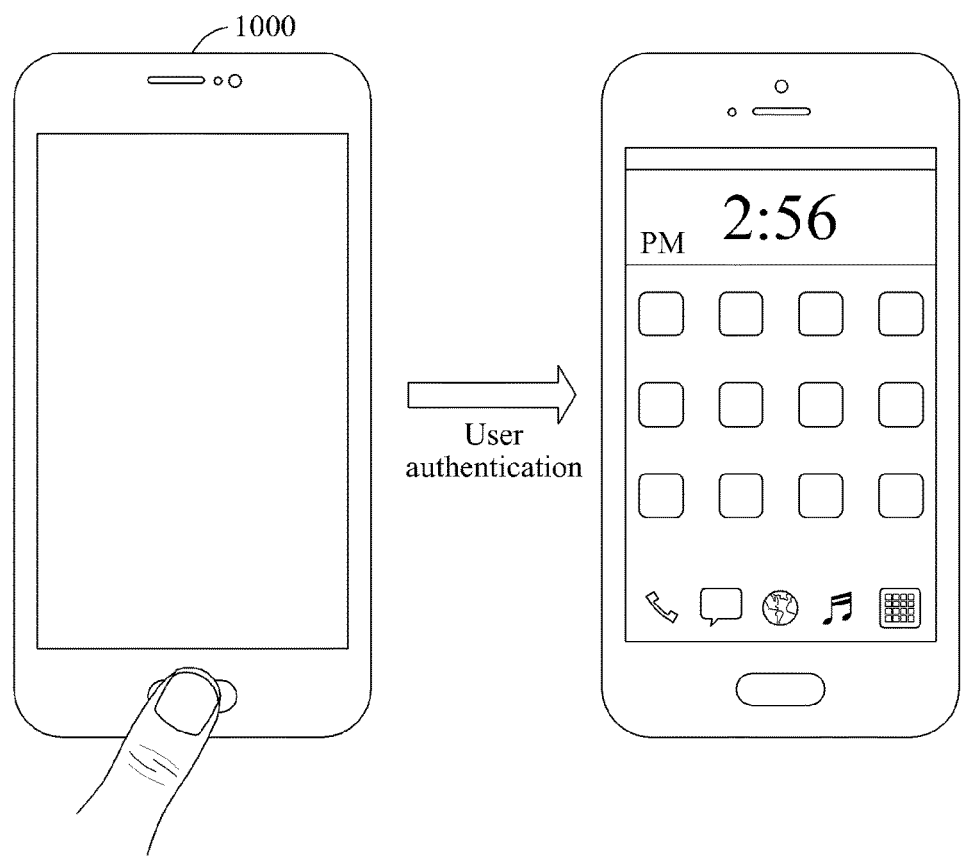
FIGS. 10A, 10B, 11, and 12 illustrate example user authentications.

Referring to FIG. 10A, a terminal 1000 receives a fingerprint image of a user in a screen lock state. The terminal 1000 compares a target image of the fingerprint image to an image of a reference cell, e.g., from a DB stored in a memory of the terminal 1000, using the above-described user authentication method. When a user is authenticated, a screen of the terminal 1000 is unlocked. The fingerprint image used to unlock the screen in FIG. 10A is merely an example, and a biometric image acquired to unlock a screen is not limited to the fingerprint image.

Figure 10B:
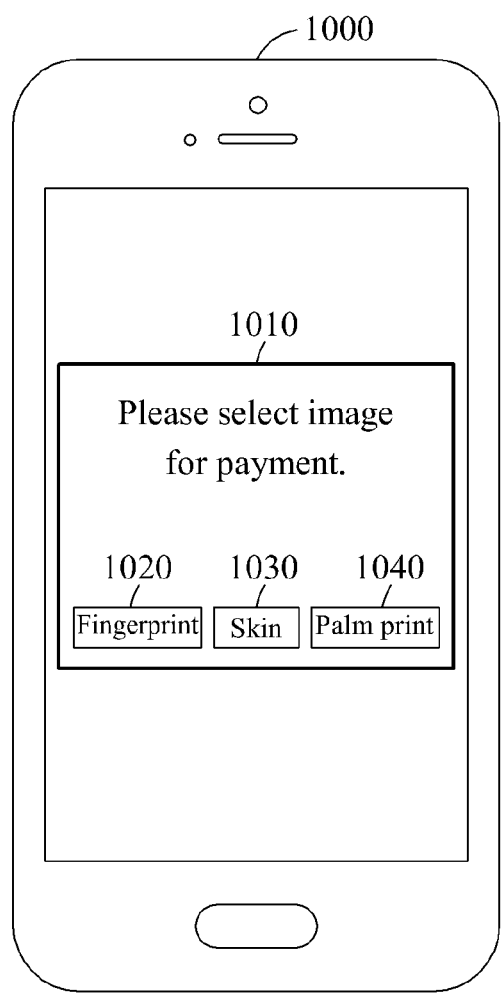

Referring to FIG. 10B, the terminal 1000 requests a user to provide a biometric image for payment. The terminal 1000 outputs a message 1010 to request the user to provide one of a fingerprint image, a skin image and a palm print image or a combination thereof. In response to an input of a fingerprint button 1020, the terminal 1000 acquires a fingerprint image of the user using a fingerprint recognition sensor. In response to an input of a skin button 1030, the terminal 1000 acquires a skin image of the user using a camera. The skin image includes, for example, an image of a skin with a scar of the user as described above. In response to an input of a palm print button 1040, the terminal 1000 acquires a palm print image of the user using the camera.

The terminal 1000 compares a target image of the biometric image to an image of a reference cell stored in the memory of the terminal 1000, and authenticates the user. The terminal 1000 selectively sends a payment request to a payment server based on user authentication.

A plurality of user authentication events may occur. For example, user authentication may be required to unlock a screen and to perform a payment. In an example, to unlock a screen, a fingerprint image is input to the terminal 1000, and N reference cells are randomly selected. In this example, the selected N reference cells are assumed as a first reference cell set. Based on a comparison between the first reference cell set and the fingerprint image, the screen is unlocked. When a user purchases a product and a payment event occurs, a request to input the fingerprint image is generated. The fingerprint image is input to the terminal 1000, and N reference cells are randomly selected. In this example, the selected N reference cells are assumed as a second reference cell set. Even though the same fingerprint image is input for unlock of the screen and payment, the first reference cell set and the second reference cell set are different from each other, which may make it is possible to strengthen security for user authentication.

Figure 11:
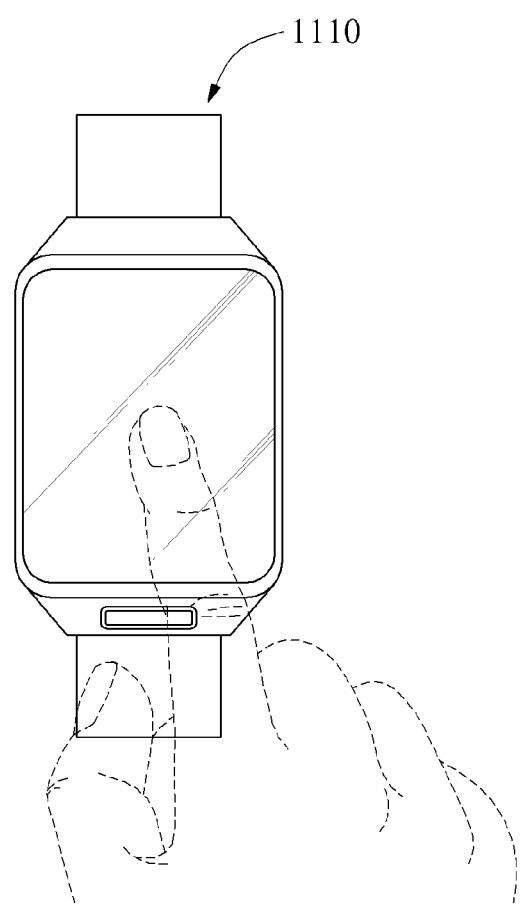

FIG. 11 illustrates a watch type wearable device 1110. The type of the wearable device 1110 is merely an example, and is not limited to the watch type.

The wearable device 1110 includes the above-described authentication apparatus, and communicates with an external device including a DB to store a plurality of cells derived from a reference image in response to user authentication being desired. The wearable device 1110 communicates with the external device using a communication interface. The communication interface includes, for example, a wireless Internet interface and a local area communication interface. The wireless Internet interface includes, for example, a wireless local area network (WLAN) interface, a wireless fidelity (Wi-Fi) Direct interface, a Digital Living Network Alliance (DLNA) interface, a Wireless Broadband (WiBro) interface, a World Interoperability for Microwave Access (WiMAX) interface, a High Speed Downlink Packet Access (HSDPA) interface, and other interfaces. The local area communication interface includes, for example, a Bluetooth interface, a radio frequency identification (RFID) interface, an Infrared Data Association (IrDA) interface, a Ultra Wideband (UWB) interface, a ZigBee interface, a near field communication (NFC) interface, and other interfaces. In addition, the communication interface includes, for example, a wired interface.

The wearable device 1110 receives a biometric image for user authentication. For example, the wearable device 1110 receives a fingerprint image of a user from a fingerprint recognition sensor located in the display of the wearable device 1110.

When the biometric image for user authentication is acquired, the wearable device 1110 communicates with the external device and receives coordinate information and image information of a reference cell, e.g., stored in a DB of the external device. The wearable device 1110 determines or identifies a target image of the biometric image and compares the target image to the image information of the reference cell. The wearable device 1110 authenticates a user based on a result of this comparison.

For example, the wearable device 1110 includes the above-described registration apparatus and the above-described authentication apparatus. In this example, the wearable device 1110 acquires a reference biometric image and stores a plurality of cells in the DB. In addition, the display of the wearable device 1110 may be used to input the reference biometric image, and the extracted reference cells may be stored in a DB in the external device.

Figure 12:
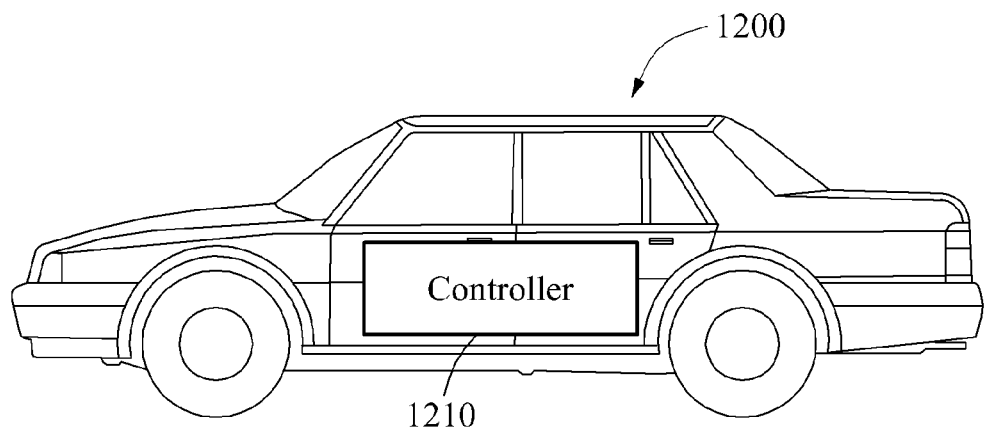

FIG. 12 illustrates a vehicle 1200. The vehicle 1200 includes a controller 1210. The vehicle 1200 may include a sensor configured to recognize a variety of biometric information. For example, a fingerprint sensor array capable of recognizing a fingerprint is located in a window of the vehicle 1200. In this example, when a user touches the window with a finger, the vehicle 1200 receives a fingerprint image of the user.

The controller 1210 authenticates a user using any of the above-described user authentication methods. In response to the user being authenticated, a door of the vehicle 1200 opens or the vehicle 1200 starts.

For example, the above-described terminal and/or the above-described wearable device are paired with the vehicle 1200. When a user is authenticated in a terminal and/or a wearable device, the terminal and/or the wearable device transmits an authentication success message to the vehicle 1200. In response to the authentication success message being received by vehicle 1200, a door of the vehicle 1200 opens or the vehicle 1200 starts.

Figure 13:
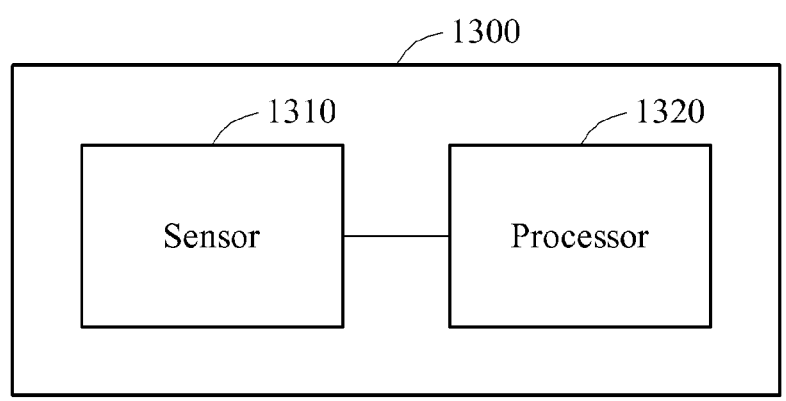
FIG. 13 illustrates an example of a configuration of an authentication apparatus.

FIG. 13 illustrates an example of a configuration of an authentication apparatus 1300.

The authentication apparatus 1300 is, for example, a mobile terminal, such as a terminal, a tablet personal computer (PC) or a wearable device. Also, the authentication apparatus 1300 is, for example, a stationary terminal, such as a desktop PC. In addition, the authentication apparatus is implemented as a chip and is included in a mobile terminal and/or a stationary terminal.

Referring to FIG. 13, the authentication apparatus 1300 includes a sensor 1310 and a processor 1320. The sensor 1310 acquires an input image including biometric information of a user. The processor 1320 matches the input image to a grid, and randomly selects at least one reference cell from a DB that stores a plurality of cells previously extracted from a reference biometric image. The processor 1320 stores the plurality of cells in the DB using the above-described biometric information registration method. In an example, the processor 1320 stores the plurality of cells in a DB included in the authentication apparatus 1300. In another example, the processor 1320 stores the plurality of cells in a DB included in an external device using a communication interface included in the authentication apparatus 1300.

Using the grid, the processor 1320 identifies a target image in a new input image stored in the DB corresponding to the reference cell, and compares the target image to an image of the reference cell. The processor 1320 requests the external device to transmit the reference cell and receives image information and coordinate information of the reference cell from the external device. The processor 1320 authenticates a user based on the result of the comparison.

The description of FIGS. 1 through 12 is also applicable to the authentication apparatus 1300 of FIG. 13, and accordingly is not repeated here.

The apparatuses, units, modules, devices, and other components illustrated in FIGS. 1, 10A, 10B, 11, 12 and 13 that perform the operations described herein with respect to FIGS. 2A, 4, 5A and 5B are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2A, 4, 5A and 5B. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A user authentication method comprising:
matching an input image comprising biometric information of a user to a grid;

randomly selecting a reference cell from among a plurality of cells randomly extracted from a reference biometric image, each cell comprising respective location information and image information of a section of the reference biometric image;

identifying a target image in the input image corresponding to the reference cell using the grid;

comparing the target image to image information of the reference cell; and authenticating the user based on a result of the comparing.

2. The user authentication method of claim 1, wherein the identifying of the target image includes comparing a location information of the reference cell to the input image.

3. The user authentication method of claim 1, wherein the matching comprises:

determining an angle at which the input image is tilted with respect to a reference direction of the grid; and adjusting an orientation of the grid based on the angle.

4. The user authentication method of claim 3, wherein the determining comprises:

obtaining a pilot cell from among the plurality of cells;

determining whether the input image includes a partial image corresponding to image information of the pilot cell; and upon determining that the input image includes the partial image, calculating the angle based on position information of the pilot cell and position information of the partial image based on the grid.

5. The user authentication method of claim 4, wherein the determining of whether the input image includes the partial image comprises:

obtaining a plurality of pilot cells from among the plurality of cells;

determining whether the input image includes a plurality of partial images corresponding to respective image information of the plurality of the pilot cells;

upon determining that the input image includes the plurality of pilot cells, determining a first distance between each of the pilot cells and a second distance between each of the partial images; and calculating the angle based on respective position information of each of the pilot cells, respective position information of each of the partial images, the first distance, and the second distance.

6. The user authentication method of claim 1, further comprising determining whether reference distance information about a distance between a plurality of randomly selected reference cells corresponds to target distance information about a distance between a plurality of target images in the input image, wherein the comparing comprises determining whether a respective target image corresponding to position information of each of the plurality of reference cells matches respective image information of each of the plurality of reference cells.

7. The user authentication method of claim 6, further comprising, in response to the plurality of target images being determined to be respectively matched to image information of the plurality of reference cells and the reference distance information being determined to correspond to the target distance information outputting feedback information indicating that the user is authenticated.

8. The user authentication method of claim 1, further comprising, in response to a plurality of reference cells being randomly selected from the database, determining an order to compare each of the plurality of reference cells to a plurality of target images of the input image.

9. The user authentication method of claim 8, wherein the comparing comprises:

matching each target image of the plurality of target images to a respective reference cell of the plurality of reference cells based on position information of the each target image and position information of the respective reference cell; and comparing each target image of the plurality of target images to image information of a respective matched reference cell.

10. The user authentication method of claim 1, wherein the plurality of cells respectively correspond to a plurality of pieces of coordinate information randomly selected from a plurality of pieces of coordinate information of the grid corresponding to the reference biometric image.

11. The user authentication method of claim 1, further comprising:

registering biometric information by acquiring the reference biometric image comprising reference biometric information of a first user;

matching the reference biometric image to the grid;

extracting the plurality of cells from the reference biometric image, each cell corresponding to coordinate information randomly selected from coordinate information of the grid; and storing the extracted plurality of cells.

12. A biometric information registration method comprising:

acquiring a reference biometric image comprising biometric information of a user;

matching the reference biometric image to a grid comprising cells, each cell comprising respective coordinate information;

randomly selecting coordinate information of a plurality of cells from among the cells of the grid;

extracting a set of cells corresponding to the selected coordinate information of the plurality of cells, from among cells of the respective biometric image corresponding to the cells of the grid;

storing the extracted set of cells in a database; and discarding non-selected cells of the reference biometric image.

13. The biometric information registration method of claim 12, further comprising selecting a pilot cell from among the extracted set of cells, wherein the pilot cell determines an angle at which an image to be authenticated is tilted with respect to a reference direction of the grid.

14. The biometric information registration method of claim 13, further comprising authenticating a user comprising:

matching the image to be authenticated to the grid;

selecting a reference cell comprising respective location information and image information from among the extracted set of cells of the reference biometric image;

identifying a target image in the image to be authenticated corresponding to the reference cell using the grid;

comparing the target image to the image information of the reference cell; and authenticating the user based on a result of the comparing.

15. An authentication apparatus comprising:

a sensor configured to acquire an input image comprising biometric information of a user; and a processor configured to match the input image to a grid, randomly select a reference cell from among a plurality of cells randomly extracted from a reference biometric image, each cell comprising respective location information and image information of a section of the reference biometric image, identify a target image in the input image corresponding to the reference cell using the grid, compare the target image to image information of the reference cell, and authenticate the user based on a result of the comparing.

16. The authentication apparatus of claim 15, wherein the reference cell comprises a portion of the reference biometric image corresponding to coordinates of the extracted cell.

17. The biometric information registration method of claim 12, further comprising acquiring, from the user, parameters of the grid, the parameters comprising any one or any combination of any two or more of a size of the grid, a size of the cells of the grid, or a shape of the cells of the grid.

18. The biometric information registration method of claim 17, further comprising changing the parameters of the grid each time a biometric image is registered.

19. The user authentication method of claim 1, further comprising, at a later time, re-authenticating the user.

20. The user authentication method of claim 19, wherein the re-authenticating of the user comprises:

acquiring a new input image from the user;

randomly selecting a new reference cell from among the plurality of cells of the reference biometric image, wherein the new reference cell is different from the reference cell;

identifying a new target image in the new input image corresponding to the new reference cell;

comparing the new target image to image information of the new reference cell; and authenticating the user based on a result of the comparing of the new target image.

21. The user authentication method of claim 1, further comprising:

if the user is not authenticated during a predetermined time, randomly selecting a new reference cell from among the plurality of cells of the reference biometric image; and authenticating the user based on the new reference cell.

* * * * *